US012753295B2

(12) United States Patent
Cho et al.

(10) Patent No.: US 12,753,295 B2
(45) Date of Patent: Oct. 6, 2026

(54) EMULSION COMPOSITION AND METHOD FOR PRODUCING SAME

(71) Applicant: KURARAY CO., LTD., Okayama (JP)

(72) Inventors: Tetsuyuki Cho, Ibaraki (JP); Yosuke Uehara, Ibaraki (JP); Yoshikazu Ueno, Ibaraki (JP); Toru Asada, Okayama (JP); Eiichi Ishida, Okayama (JP)

(73) Assignee: KURARAY CO., LTD., Okayama (JP)

( * ) Notice: Subject to any disclaimer, the term of this patent is extended or adjusted under 35 U.S.C. 154(b) by 694 days.

(21) Appl. No.: 18/023,555

(22) PCT Filed: Aug. 31, 2021

(86) PCT No.: PCT/JP2021/031831

§ 371 (c)(1),
(2) Date: Feb. 27, 2023

(87) PCT Pub. No.: WO2022/045344

PCT Pub. Date: Mar. 3, 2022

(65) Prior Publication Data

US 2023/0303808 A1 Sep. 28, 2023

(30) Foreign Application Priority Data

Aug. 31, 2020 (JP) ................................ 2020-145643

(51) Int. Cl.
*C08L 9/00* (2006.01)
*C08J 3/09* (2006.01)

(52) U.S. Cl.
CPC ................ *C08L 9/00* (2013.01); *C08J 3/092* (2013.01); *C08J 2309/00* (2013.01)

(58) Field of Classification Search
CPC .......... C08L 9/00; C08J 3/092; C08J 2309/00
See application file for complete search history.

(56) References Cited

U.S. PATENT DOCUMENTS

| | | | | |
|---|---|---|---|---|
| 4,362,841 | A | 12/1982 | Minatono et al. | |
| 2007/0232745 | A1 | 10/2007 | Sakaki et al. | |
| 2021/0222036 | A1 * | 7/2021 | Asada | C08F 136/08 |

FOREIGN PATENT DOCUMENTS

| | | | | |
|---|---|---|---|---|
| JP | 49-000332 | A | 1/1974 | |
| JP | S54-093034 | A | 7/1979 | |
| JP | 54-124040 | A | 9/1979 | |
| JP | 54-124043 | A | 9/1979 | |
| JP | 55-108428 | A | 8/1980 | |
| JP | 56-112946 | A | 9/1981 | |
| JP | 62-141033 | A | 6/1987 | |
| JP | H10-330720 | A | 12/1998 | |
| JP | 2004-307544 | A | 11/2004 | |
| JP | 2006-316097 | A | 11/2006 | |
| JP | 2007-291347 | A | 11/2007 | |
| JP | 2008-101055 | A | 5/2008 | |
| JP | 2015-143369 | A | 8/2015 | |
| JP | 2016-033216 | A | 3/2016 | |
| JP | 2019-206771 | A | 12/2019 | |
| WO | WO-2019230700 | A1 * | 12/2019 | C09J 109/00 |

OTHER PUBLICATIONS

Official communication issued in EP Patent Application No. 21861765.2, Aug. 26, 2024.
Yamaguchi et al. "Latexification and Adhesion of Liquid Application to Adhesives", Journal of the Society of Rubber Industry, Japan, vol. 57, No. 10, (1984) pp. 78-89, translation.
ISR issued in International Patent Application No. PCT/JP2021/031831, Oct. 12, 2021, translation.
Written Opinion issued in International Patent App. No. PCT/JP2021/031831, Oct. 12, 2021, translation.

* cited by examiner

*Primary Examiner* — Angela C Scott
(74) *Attorney, Agent, or Firm* — GREENBLUM & BERNSTEIN, P.L.C.

(57) ABSTRACT

Provided are an emulsion composition which can be produced more easily than a conventional method and has excellent emulsion stability, and a method for producing the same. The emulsion composition contains a liquid conjugated diene rubber, a diluent having a vapor pressure at 20° C. of 10 Pa or less, a surfactant, and water.

7 Claims, No Drawings

EMULSION COMPOSITION AND METHOD FOR PRODUCING SAME

TECHNICAL FIELD

The present invention relates to an emulsion composition having excellent emulsion stability, and a method for producing the same.

BACKGROUND ART

Liquid rubbers are used in various fields as tackifiers, adhesives, cold resistance improvers for rubbers, processing oil agents, reactive plasticizers, and the like. When a liquid rubber is used in these applications, the liquid rubber is generally used as it is, but may be used after being emulsified. When the molecular weight of the liquid rubber is about several thousands, the viscosity is low, and thus the liquid rubber can be easily emulsified by using a general emulsifier. However, when the molecular weight of the liquid rubber is about several tens of thousands, the viscosity is high, and thus it is difficult to emulsify the liquid rubber. In this case, it is also possible to emulsify the liquid rubber by applying an extremely large mechanical shearing, but there are problems in that dedicated equipment is required and the production process becomes complicated. Further, even if the liquid rubber can be emulsified, since the stability is poor, there is also a problem that phase separation occurs during storage.

As a method for solving such a problem, PTL 1 proposes a method in which an organic solvent solution (A) of a polymer and an aqueous medium (B) are mixed in the presence of an emulsifier to prepare an oil-in-water emulsion, wherein the (A) and (B) are mixed at a specific volume ratio with low-speed stirring to prepare a water-in-oil emulsion, and the mixture is further stirred at a high speed to cause phase inversion to obtain an oil-in-water emulsion. Further, PTL 2 proposes an emulsification method characterized by using water in emulsification of a liquid cis-1,4-polyisoprene rubber having a molecular weight of 10,000 to 60,000, the cis-1,4-polyisoprene rubber is not dissolved in an organic solvent, and water is used in a range of at most 80 parts by mass or less with respect to 100 parts by mass of the liquid cis-1,4-polyisoprene rubber.

Furthermore, PTL 3 proposes an emulsification method using a dialkyl sulfosuccinate as an emulsifier for a liquid polyisoprene having a molecular weight of 10,000 to 60,000, and PTL 4 proposes a method for producing an emulsion using a polyoxyethylene alkyl (allyl) ether phosphate as an emulsifier when emulsifying a liquid polyisoprene having a molecular weight of 10,000 to 60,000.

Furthermore, NPL 1 describes, as a method for emulsifying a liquid rubber, a method in which the liquid rubber is diluted with an organic solvent, then mixed with an emulsifier and water, and then emulsified by distilling off the organic solvent.

CITATION LIST

Patent Literature

PTL 1: JP 49-332 B
PTL 2: JP 54-124043 A
PTL 3: JP 62-141033 A
PTL 4: JP 54-124040 A

Non-Patent Literature

NPL 1: Journal of the Society of Rubber Industry, Japan, Vol. 57, No. 10, pp. 78-89

SUMMARY OF INVENTION

Technical Problem

Although an emulsion composition can be obtained even by a conventional method, the stability of the emulsion is not sufficient. In addition, particularly in the method of PTL 1, since it is necessary to stir a composition having a high viscosity at a high speed, dedicated equipment is required, and thus the composition cannot be easily produced. Further, in NPL 1, since an organic solvent is used, a step of distilling off the solvent is required, and thus the production method is complicated.

The present invention has been made in view of the above problems, and an object of the present invention is to provide an emulsion composition which can be produced more easily than a conventional method and is excellent in emulsion stability, and a method for producing the same.

Solution to Problem

As a result of various studies on emulsification of a liquid conjugated diene rubber, the present inventors have found that when a diluent having a vapor pressure at 20° C. of 10 Pa or less is used, a very stable emulsion composition in which phase separation hardly occurs can be obtained, and further, an emulsion composition can be obtained by a simple method as compared with a conventional method, and have completed the present invention.

That is, the present invention provides the following [1] to [7].

[1] An emulsion composition containing a liquid conjugated diene rubber, a diluent having a vapor pressure at 20° C. of 10 Pa or less, a surfactant, and water.

[2] The emulsion composition as set forth in [1], wherein the liquid conjugated diene rubber contains a monomer unit derived from one or more selected from butadiene, isoprene, and β-farnesene.

[3] The emulsion composition as set forth in [1] or [2], wherein the liquid conjugated diene rubber is a modified conjugated diene rubber having a hydrogen bonding functional group in a part of the conjugated diene rubber.

[4] The emulsion composition as set forth in [3], wherein the hydrogen bonding functional group is one or more selected from a hydroxy group, an epoxy group, an aldehyde group, an acetalized product of an aldehyde group, a carboxy group, a salt of a carboxy group, an esterified product of a carboxy group, an acid anhydride of a carboxy group, a boronyl group, a salt of a boronyl group, an esterified product of a boronyl group, a silanol group, and an esterified product of a silanol group.

[5] The emulsion composition as set forth in any of [1] to [4], wherein the surfactant is a nonionic surfactant.

[6] The emulsion composition as set forth in any of [1] to [5], wherein a content of the surfactant in the emulsion composition is 1 to 15 parts by mass with respect to 100 parts by mass of a total of the liquid conjugated diene rubber and the diluent.

[7] A method for producing the emulsion composition as set forth in any of [1] to [6], the method including mixing the liquid conjugated diene rubber, the diluent, the surfactant, and water to produce an oil-in-water emulsion, and then not removing the diluent.

Advantageous Effects of Invention

According to the present invention, it is possible to provide an emulsion composition which can be produced more easily than a conventional method and has excellent emulsion stability, and a method for producing the emulsion composition.

DESCRIPTION OF EMBODIMENTS

[Emulsion Composition]

The emulsion composition of the present invention is an emulsion composition containing a liquid conjugated diene rubber, a diluent having a vapor pressure at 20° C. of 10 Pa or less, a surfactant, and water.

According to the present invention, since a liquid conjugated diene rubber and a diluent having a vapor pressure at 20° C. of 10 Pa or less are used in combination, it is possible to obtain a highly stable emulsion composition in which phase separation is not easily caused. If the vapor pressure of the diluent at 20° C. exceeds 10 Pa, the diluent may evaporate during storage, and the emulsion particles may collapse. In contrast, when the vapor pressure of the diluent at 20° C. is 10 Pa or less, it is possible to suppress the collapse of the emulsion particles. In addition, since the viscosity of the emulsion composition of the present invention does not easily increase during the production thereof, the production is easy, and the handleability is also excellent. Further, contamination of production equipment can be suppressed, and at the same time, a step of removing a diluent can be made unnecessary as compared with a production method in which dilution is performed using an organic solvent, and therefore, the production efficiency is excellent.

Since the emulsion composition of the present invention has a stable emulsion, when it is used as an adhesive, it can be more uniformly and efficiently adhered to an object to be adhered, and as a result, the adhesive force is also improved.

Hereinafter, the present invention will be described in detail.

<Liquid Conjugated Diene Rubber>

The liquid conjugated diene rubber used in the present invention contains at least a monomer unit derived from a conjugated diene (hereinafter, also referred to as a "conjugated diene unit") in the molecule, and for example, it is preferred that the monomer unit derived from a conjugated diene is contained in an amount of 50 mol % or more in all the monomer units of the conjugated diene rubber.

In the description herein, the liquid conjugated diene rubber is one having a melt viscosity of 30 Pa·s or more and 4,000 Pa·s or less as measured at 38° C. From the viewpoint of improving adhesiveness, the melt viscosity is preferably 35 Pa·s or more, and more preferably 40 Pa·s or more. On the other hand, the melt viscosity is preferably 2,500 Pa·s or less, more preferably 1,500 Pa·s or less, still more preferably 1,000 Pa·s or less, and even more preferably 500 Pa·s or less, from the viewpoint of improving the stability of the emulsion and from the viewpoint of improving the handleability. When the melt viscosity is within the above range, the dispersibility of the emulsion composition is improved, and an increase in viscosity is suppressed, so that the handleability can be improved.

The melt viscosity of the liquid conjugated diene rubber means a viscosity measured at 38° C. using a Brookfield viscometer (B-type viscometer).

Examples of the conjugated diene monomer include butadiene, 2-methyl-1,3-butadiene (hereinafter, also referred to as "isoprene"), 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, β-farnesene (hereinafter, also referred to as "farnesene"), myrcene, and chloroprene. These conjugated dienes may be used alone or may be used in combination of two or more thereof.

From the viewpoint of adhesiveness when the emulsion composition is used as an adhesive, the liquid conjugated diene rubber more preferably contains a monomer unit derived from one or more selected from butadiene, isoprene, and farnesene.

The liquid conjugated diene rubber used in the present invention may contain a unit derived from a monomer other than the conjugated diene monomer as long as the effect of the present invention is not impaired. Examples of the other monomer include a copolymerizable ethylenically unsaturated monomer and an aromatic vinyl compound.

Examples of the ethylenically unsaturated monomer include olefins such as ethylene, 1-butene, and isobutylene.

Examples of the aromatic vinyl compound include styrene, α-methylstyrene, 2-methylstyrene, 3-methylstyrene, 4-methylstyrene, 4-propylstyrene, 4-tert-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. These may be used alone or may be used in combination of two or more thereof.

In the case where the liquid conjugated diene rubber contains a monomer unit derived from a monomer other than the conjugated diene monomer, the content thereof is preferably 30 mol % or less, more preferably 10 mol % or less, and still more preferably 5 mol % or less.

The liquid conjugated diene rubber used in the present invention is preferably a modified conjugated diene rubber having a hydrogen bonding functional group in a part of the conjugated diene rubber, and more preferably a modified conjugated diene rubber containing a conjugated diene unit in at least a part of the polymer chain and having a hydrogen bonding functional group in a side chain or at an end of the polymer chain.

When the conjugated diene rubber is the modified conjugated diene rubber, in a case where the emulsion composition of the present invention is used as an adhesive, the modified conjugated diene rubber interacts with an adherend, and thus the adhesive force can be improved.

In the description herein, the "hydrogen bonding" means a bonding interaction formed between a hydrogen atom (donor) which is bonded to an atom having a high electronegativity (O, N, S, or the like) and is electrically positively polarized and an electrically negative atom (acceptor) having a lone pair of electrons.

In the present invention, the "hydrogen bonding functional group" is a functional group capable of functioning as a donor and an acceptor in the hydrogen bonding. Specific examples thereof include a hydroxy group, an epoxy group, an ether group, a mercapto group, a carboxy group, a carbonyl group, an aldehyde group, an amino group, an imino group, an imidazole group, a urethane group, an amide group, a urea group, an isocyanate group, a nitrile group, a boronyl group, a silanol group, and derivatives thereof. Examples of the derivative of the aldehyde group include an acetalized product thereof. Examples of the derivative of the carboxy group include a salt thereof, an esterified product thereof, an amidated product thereof, and an acid anhydride thereof. Examples of the derivative of the boronyl group include a salt thereof and an esterified product thereof. Examples of the derivative of the silanol group include an esterified product thereof. Further, examples of the carboxy group include a group derived from a monocarboxylic acid and a group derived from a dicarboxylic acid.

Among these, from the viewpoint of improving adhesiveness and ease of production of the liquid conjugated diene rubber, one or more selected from a hydroxy group, an epoxy group, an aldehyde group, an acetalized product of an aldehyde group, a carboxy group, a salt of a carboxy group, an esterified product of a carboxy group, an acid anhydride of a carboxy group, a boronyl group, a salt of a boronyl group, an esterified product of a boronyl group, a silanol group, and an esterified product of a silanol group are preferred; one or more selected from a hydroxy group, an epoxy group, a carboxy group, a salt of a carboxy group, an esterified product of a carboxy group, an acid anhydride of a carboxy group, a boronyl group, a salt of a boronyl group, and an esterified product of a boronyl group are more preferred; and one or more selected from a carboxy group, an esterified product of a carboxy group, a boronyl group, and an esterified product of a boronyl group are still more preferred.

The number of the hydrogen bonding functional groups in the modified conjugated diene rubber is preferably 0.5 or more, more preferably 2 or more, and still more preferably 3 or more on average per molecule from the viewpoint of improving adhesiveness when the emulsion composition is used as an adhesive. On the other hand, from the viewpoint of controlling the viscosity of the modified conjugated diene rubber in an appropriate range and improving the handleability, the number of the hydrogen bonding functional groups on average per molecule is preferably 80 or less, more preferably 40 or less, still more preferably 20 or less, and even more preferably 10 or less.

The average number of hydrogen bonding functional groups per molecule of the modified conjugated diene rubber is calculated from the equivalent amount (g/eq) of the hydrogen bonding functional group of the modified conjugated diene rubber and the number average molecular weight Mn in terms of styrene based on the following equation. The equivalent amount of the hydrogen bonding functional group of the modified conjugated diene rubber means the mass of the conjugated diene bonded to one hydrogen bonding functional group and the mass of the monomer other than the conjugated diene contained as necessary.

Average number of hydrogen bonding functional groups per molecule=[(number average molecular weight (Mn))/(molecular weight of styrene unit)×(average molecular weight of conjugated diene and monomer unit other than conjugated diene contained as necessary)]/(equivalent amount of hydrogen bonding functional group)

The method for calculating the equivalent amount of the hydrogen bonding functional group can be appropriately selected depending on the type of the hydrogen bonding functional group.

Examples of the method for obtaining the modified conjugated diene rubber include a method of adding a modifying compound to a polymerized product of a conjugated diene monomer (hereinafter also referred to as "production method (1)"), a method of oxidizing a conjugated diene polymer (hereinafter also referred to as "production method (2)"), a method of copolymerizing a conjugated diene monomer and a radical polymerizable compound having a hydrogen bonding functional group (hereinafter also referred to as "production method (3)"), and a method of adding a modifying compound capable of reacting with a polymerization active end before adding a polymerization terminator to a polymerized product of an unmodified conjugated diene monomer having a polymerization active end (hereinafter also referred to as "production method (4)").

[Production Method (1) of Modified Conjugated Diene Rubber]

The production method (1) is a method of adding a modifying compound to a polymerized product of a conjugated diene monomer, that is, an unmodified conjugated diene rubber (hereinafter, also referred to as an "unmodified conjugated diene rubber").

The unmodified conjugated diene rubber can be obtained by polymerizing a conjugated diene and optionally another monomer other than the conjugated diene by, for example, an emulsion polymerization method, a solution polymerization method, or the like.

As the solution polymerization method, a known method or a method according to the known method can be applied. For example, a monomer containing a predetermined amount of a conjugated diene is polymerized in a solvent using a Ziegler-based catalyst, a metallocene-based catalyst, or an active metal or active metal compound capable of anionic polymerization, optionally in the presence of a polar compound.

Examples of the solvent include aliphatic hydrocarbons such as n-butane, n-pentane, isopentane, n-hexane, n-heptane, and isooctane; alicyclic hydrocarbons such as cyclopentane, cyclohexane, and methylcyclopentane; and aromatic hydrocarbons such as benzene, toluene, and xylene.

Examples of the active metal capable of anionic polymerization include alkali metals such as lithium, sodium potassium; alkaline earth metals such as beryllium, magnesium, calcium, strontium, and barium; and lanthanoid rare earth metals such as lanthanum and neodymium. Among these active metals capable of anionic polymerization, alkali metals and alkaline earth metals are preferred, and alkali metals are more preferred.

The active metal compound capable of anionic polymerization is preferably an organic alkali metal compound. Examples of the organic alkali metal compound include organic monolithium compounds such as methyllithium, ethyllithium, n-butyllithium, sec-butyllithium, t-butyllithium, hexyllithium, phenyllithium, and stilbenelithium; polyfunctional organic lithium compounds such as dilithiomethane, dilithionaphthalene, 1,4-dilithiobutane, 1,4-dilithio-2-ethylcyclohexane, and 1,3,5-trilithiobenzene; and sodium naphthalene and potassium naphthalene. Among these organic alkali metal compounds, organic lithium compounds are preferred, and organic monolithium compounds are more preferred.

The amount of the organic alkali metal compound used can be appropriately set according to the melt viscosity, molecular weight, and the like of the target unmodified conjugated diene rubber and modified conjugated diene rubber, but the organic alkali metal compound is usually used in an amount of 0.01 to 3 parts by mass with respect to 100 parts by mass of all monomers including the conjugated diene.

The organic alkali metal compound can also be used as an organic alkali metal amide by reacting with a secondary amine such as dibutylamine, dihexylamine, or dibenzylamine.

In the anionic polymerization, the polar compound is usually used for adjusting the microstructure of the conjugated diene moiety without deactivating the reaction. Examples of the polar compound include ether compounds such as dibutyl ether, tetrahydrofuran, ethylene glycol diethyl ether, and 2,2-di(2-tetrahydrofuryl)propane; tertiary amines such as tetramethylethylenediamine and trimethylamine; alkali metal alkoxides, and phosphine compounds. The polar compound is usually used in an amount of 0.01 to 1,000 moles with respect to the organic alkali metal compound.

The temperature of the solution polymerization is usually in the range of −80 to 150° C., preferably in the range of 0 to 100° C., and more preferably in the range of 10 to 90° C. The polymerization mode may be either a batch mode or a continuous mode.

The polymerization reaction can be terminated by addition of a polymerization terminator. Examples of the polymerization terminator include alcohols such as methanol and isopropanol. The unmodified conjugated diene rubber can be isolated by pouring the obtained polymerization reaction liquid into a poor solvent such as methanol to precipitate a polymerized product, or by washing the polymerization reaction liquid with water, followed by separation and drying.

As the method for producing the unmodified conjugated diene rubber, among the above-mentioned methods, the solution polymerization method is preferred.

As the emulsion polymerization method, a known method or a method according to the known method can be applied. For example, a monomer containing a predetermined amount of a conjugated diene is emulsified and dispersed in the presence of an emulsifier, and is subjected to emulsion polymerization with a radical polymerization initiator.

Examples of the emulsifier include long-chain fatty acid salts having 10 or more carbon atoms and rosin acid salts. Examples of the long-chain fatty acid salt include potassium salts or sodium salts of fatty acids such as capric acid, lauric acid, myristic acid, palmitic acid, oleic acid, and stearic acid.

As the dispersion solvent, water is usually used, and a water-soluble organic solvent such as methanol or ethanol may be contained as long as the stability at the time of polymerization is not impaired.

Examples of the radical polymerization initiator include persulfates such as ammonium persulfate and potassium persulfate, organic peroxides, and hydrogen peroxide.

In order to adjust the molecular weight of the obtained unmodified conjugated diene rubber, a chain transfer agent may be used. Examples of the chain transfer agent include mercaptans such as t-dodecyl mercaptan and n-dodecyl mercaptan; carbon tetrachloride, thioglycolic acid, diterpene, terpinolene, γ-terpinene, and α-methylstyrene dimer.

The temperature of the emulsion polymerization can be appropriately set depending on the type of the radical polymerization initiator to be used, and is usually in the range of 0 to 100° C., and preferably in the range of 0 to 60° C. The polymerization mode may be either continuous polymerization or batch polymerization.

The polymerization reaction can be terminated by addition of a polymerization terminator. Examples of the polymerization terminator include amine compounds such as isopropylhydroxylamine, diethylhydroxylamine, and hydroxylamine; quinone compounds such as hydroquinone and benzoquinone; and sodium nitrite.

After the termination of the polymerization reaction, an aging inhibitor may be added as necessary. After the termination of the polymerization reaction, unreacted monomers are removed from the obtained latex as necessary, and then the polymerized product is coagulated using a salt such as sodium chloride, calcium chloride, or potassium chloride as a coagulant while adjusting the pH of the coagulation system to a predetermined value by adding an acid such as nitric acid or sulfuric acid as necessary, and then the polymerized product is recovered by separating the dispersion solvent. Next, the polymerized product is washed with water, dehydrated, and then dried to obtain an unmodified conjugated diene rubber. At the time of coagulation, if necessary, the latex may be mixed with an extension oil which has been made into an emulsified dispersion in advance, and recovered as an oil-extended unmodified conjugated diene rubber.

(Modifying Compound Used in Production Method (1))

The modifying compound used in the production method (1) is not particularly limited, but from the viewpoint of improving adhesiveness when the emulsion composition is used as an adhesive, a modifying compound having a hydrogen bonding functional group is preferred. Examples of the hydrogen bonding functional group are the same as those described above. Among these, from the viewpoint of the strength of the hydrogen bonding force, a hydroxy group, an epoxy group, an aldehyde group, an acetalized product of an aldehyde group, a carboxy group, a salt of a carboxy group, an esterified product of a carboxy group, an acid anhydride of a carboxy group, a boronyl group, a salt of a boronyl group, an esterified product of a boronyl group, a silanol group, and an esterified product of a silanol group are preferred.

Examples of the modifying compound include unsaturated carboxylic acids such as maleic acid, fumaric acid, citraconic acid, and itaconic acid; unsaturated carboxylic acid anhydrides such as maleic anhydride, citraconic anhydride, 2,3-dimethylmaleic anhydride, and itaconic anhydride; unsaturated carboxylic acid esters such as maleic ester, fumaric ester, citraconic ester, and itaconic ester; unsaturated carboxylic acid amides such as maleic amide, fumaric amide, citraconic amide, and itaconic amide; unsaturated carboxylic acid imides such as maleic imide, fumaric imide, citraconic imide, and itaconic imide; silane compounds such as vinyltrimethoxysilane, γ-methacryloxypropyltrimethoxysilane, mercaptomethylmethyldiethoxysilane, mercaptomethyltriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptop ropyltrimethoxysilane, 3-mercaptopropyltriethoxysilane, 3-mercaptopropyldimethoxymethylsilane, 3-mercaptopropyldiethoxymethylsilane, 3-mercaptop ropyldimethoxyethylsilane, 3-mercaptopropyldiethoxyethylsilane, 3-mercaptopropylmethoxydimethylsilane, and 3-mercaptopropylethoxydimethylsilane; and boronic acid esters such as triethyl borate, tripropyl borate, triisopropyl borate, and tributyl borate. These modifying compounds having a hydrogen bonding functional group may be used alone or may be used in combination of two or more thereof.

The amount of the modifying compound used is preferably 0.1 to 100 parts by mass, more preferably 0.5 to 50 parts by mass, and still more preferably 1 to 30 parts by mass with respect to 100 parts by mass of the unmodified conjugated diene rubber.

The reaction temperature is usually preferably in the range of 0 to 200° C., and more preferably in the range of 50 to 200° C.

Further, after the hydrogen bonding functional group is introduced by grafting the modifying compound to the unmodified conjugated diene rubber, another hydrogen bonding functional group may be introduced into the polymer by further adding a modifying compound capable of reacting with the functional group. Specific examples thereof include a method in which maleic anhydride is grafted to an unmodified conjugated diene rubber obtained by living anionic polymerization, and then a compound having a hydroxy group such as 2-hydroxyethyl methacrylate or methanol, or a compound such as water is reacted.

The amount of the modifying compound added to the modified conjugated diene rubber is preferably 0.5 to 40 parts by mass, more preferably 1 to 30 parts by mass, and still more preferably 1.5 to 20 parts by mass with respect to 100 parts by mass of the unmodified conjugated diene rubber. The amount of the modifying compound added to the modified conjugated diene rubber can be calculated based on the acid value of the modifying compound, and can also be determined using various analytical instruments such as infrared spectroscopy and nuclear magnetic resonance spectroscopy.

The method of adding the modifying compound to the unmodified conjugated diene rubber is not particularly limited, and examples thereof include a method of adding a liquid unmodified conjugated diene rubber and one or more modifying compounds selected from an unsaturated carboxylic acid, an unsaturated carboxylic acid derivative, a boronic acid derivative, a silane compound, and the like, and further adding a radical generator as necessary, and heating the mixture in the presence or absence of an organic solvent. The radical generator to be used is not particularly limited, and organic peroxides, azo compounds, hydrogen peroxide, and the like, which are usually commercially available, can be used.

Examples of the organic solvent used in the above method generally include a hydrocarbon-based solvent and a halogenated hydrocarbon-based solvent. Among these organic solvents, hydrocarbon-based solvents such as n-butane, n-hexane, n-heptane, cyclohexane, benzene, toluene, and xylene are preferred.

Further, when the reaction of adding the modifying compound is carried out by the above-mentioned method, an aging inhibitor may be added from the viewpoint of suppressing a side reaction. As the aging inhibitor, an usually commercially available product can be used, and examples thereof include butylated hydroxytoluene (BHT) and N-phenyl-N'-(1,3-dimethylbutyl)-p-phenylenediamine (NOCRAC 6C).

The addition amount of the aging inhibitor is preferably 0.01 to 10 parts by mass, and more preferably 0.05 to 5 parts by mass, with respect to 100 parts by mass of the unmodified conjugated diene rubber. When the addition amount of the aging inhibitor is within the above range, a side reaction can be suppressed, and the modified conjugated diene rubber can be obtained with good yield.

[Production Method (2) of Modified Conjugated Diene Rubber]

As the production method (2), there is a method of obtaining an oxidized conjugated diene rubber having a functional group or bond containing oxygen generated by an oxidation reaction in the molecule by oxidizing a conjugated diene rubber as a raw material. Specific examples of the functional group or bond include a hydroxy group, an aldehyde group, a carbonyl group, a carboxy group, and an ether bond.

Examples of the method for oxidizing the raw material conjugated diene rubber include a method in which the raw material conjugated diene rubber is heat-treated at a temperature equal to or higher than the oxidation temperature (hereinafter also referred to as "production method (2-1)"), and a method in which the raw material conjugated diene rubber is activated by irradiation with light having an absorption wavelength of the raw material conjugated diene rubber to react with oxygen (hereinafter also referred to as "production method (2-2)"). Among these, a method in which the raw material conjugated diene rubber is heat-treated at a temperature equal to or higher than the oxidation temperature (production method (2-1)) is preferred.

[Production Method (2-1) of Oxidized Conjugated Diene Rubber]

The production method (2-1) is a method in which the raw material conjugated diene rubber is heat-treated at a temperature equal to or higher than the oxidation temperature. The heat treatment is performed in an atmosphere containing oxygen, preferably in an air atmosphere.

The temperature of the heat treatment is not particularly limited as long as it is a temperature at which the raw conjugated diene rubber is oxidized, but is preferably 150° C. or higher, more preferably 170° C. or higher, and still more preferably 190° C. or higher, from the viewpoint of increasing the oxidation reaction speed and improving the productivity.

The heat treatment time is not particularly limited as long as the raw material conjugated diene rubber is not deteriorated, but is preferably 30 minutes or less, and more preferably 20 minutes or less.

In addition, by adding a thermal radical generator to the raw material conjugated diene rubber, the temperature required for the oxidation reaction can be lowered.

Examples of the thermal radical generator include peroxides, azo compounds, and redox initiators. Among these, peroxides are preferred from the viewpoint that the thermal radical generator is bonded to the conjugated diene rubber and an oxygen-containing structure is added to the conjugated diene rubber.

Examples of the peroxide include t-butyl hydroperoxide, cumene hydroperoxide, t-butyl peroxyacetate, t-butyl peroxybenzoate, t-butyl peroxyoctanoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, and ammonium persulfate.

Examples of the azo compound include azobisisobutyronitrile (AIBM, 2,2'-azobis(isobutyronitrile), 2,2'-azobis(2-butanenitrile), 4,4'-azobis(4-pentanoate), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutyramidine)dichloride, 2,2'-azobis(N,N-dimethyleneisobutylamide), 2,2'-azobis(2-methyl-N-[1,1-bis(hydroxymethyl)-2-hydroxyethyl]propionamide), and 2,2'-azobis(isobutylamide) dihydrate. The thermal radical generator may be used alone or in combination of two or more thereof.

Further, a redox initiator may be used as the thermal radical generator. Examples of the redox initiator include a combination of a pervulcanized acid salt, sodium hydrogen sulfite and ferrous sulfate, a combination of t-butyl hydroperoxide, sodium hydrogen sulfite and ferrous sulfate, and a combination of p-menthane hydroperoxide, ferrous sulfate, sodium ethylenediaminetetraacetate and sodium formaldehyde sulfoxylate.

[Production Method (2-2) of Oxidized Conjugated Diene Rubber]

The production method (2-2) is a method in which the raw material conjugated diene rubber is activated by being irradiated with light having an absorption wavelength of the raw material conjugated diene rubber to be reacted with oxygen.

The production method (2-2) is carried out in an atmosphere containing oxygen, preferably in an air atmosphere. The wavelength of the light to be used is not particularly limited as long as it is a wavelength which is absorbed by the raw material conjugated diene rubber and causes a radical reaction, but ultraviolet light which is strongly absorbed by the raw material conjugated diene rubber is preferred.

Further, by adding a photo-radical generator to the raw material conjugated diene rubber, the irradiation amount of light required for the oxidation reaction can be reduced.

Examples of the photo-radical generator include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4,4'-dimethoxybenzophenone, benzoin propyl ether, benzyl dimethyl ketal, 1-(4-isopropylphenyl)-2-hydroxy-2-methylpropan-1-one, 2-hydroxy-2-methyl-1-phenylpropane-1-one, thioxanthone, diethylthioxanthone, 2-methyl-1-[4-(methylthio)phenyl]-2-morpholino-propane-1-one, 2-benzyl-2-dimethylamino-1-(4-morpholinophenyl)-butanone-1,4-(2-hydroxyethoxy)phenyl-(2-hydroxy-2-propyl)ketone, 2,4,6-trimethylbenzoyldiphenylphosphine oxide, and bis-(2,6-dimethoxybenzoyl)-2,4,4-trimethylpentylphosphine oxide. The photo-radical generator may be used alone or in combination of two or more thereof.

[Production Method (3) of Modified Conjugated Diene Rubber]

Examples of the production method (3) include a method in which a conjugated diene monomer and a radical polymerizable compound having a hydrogen bonding functional group are subjected to random copolymerization, block copolymerization, or graft copolymerization by a known method.

(Radical Polymerizable Compound Having Hydrogen Bonding Functional Group Used in Production Method (3))

The radical polymerizable compound having a hydrogen bonding functional group used in the production method (3) is not particularly limited as long as it is a compound having both a hydrogen bonding functional group and a reactive multiple bond in the molecule. Specific examples thereof include an aldehyde having a reactive multiple bond and an acetalized product of the aldehyde; a monocarboxylic acid having a reactive multiple bond, a salt of the monocarboxylic acid, an esterified product of the monocarboxylic acid, and an acid anhydride of the monocarboxylic acid; a dicarboxylic acid having a reactive multiple bond, a salt of the dicarboxylic acid, an esterified product of the dicarboxylic acid, and an acid anhydride of the dicarboxylic acid; and an amine compound having a reactive multiple bond.

Among the aldehydes having a multiple bond, examples of the aldehyde having a reactive carbon-carbon double bond include unsaturated aldehydes, such as alkenals having 3 to 30 carbon atoms, preferably alkenals having 3 to 25 carbon atoms, such as acrolein, methacrolein, crotonaldehyde, 3-butenal, 2-methyl-2-butenal, 2-methyl-3-butenal, 2,2-dimethyl-3-butenal, 3-methyl-2-butenal, 3-methyl-3-butenal, 2-pentenal, 2-methyl-2-pentenal, 3-pentenal, 3-methyl-4-pentenal, 4-pentenal, 4-methyl-4-pentenal, 2-hexenal, 3-hexenal, 4-hexenal, 5-hexenal, 7-octenal, 10-undecenal, 2-ethylcrotonaldehyde, 3-(dimethylamino) acrolein, myristaldehyde, palmitoleic aldehyde, oleic aldehyde, elaidic aldehyde, vaccenic aldehyde, gadoleic aldehyde, erucic aldehyde, nervonic aldehyde, linoleic aldehyde, citronellal, cinnamaldehyde, and vanillin; alkadienals having 5 to 30 carbon atoms, preferably alkadienals having 5 to 25 carbon atoms, such as 2,4-pentadienal, 2,4-hexadienal, 2,6-nonadienal, and citral; alkatrienals having 7 to 30 carbon atoms, preferably alkatrienals having 7 to 25 carbon atoms, such as linolenic aldehyde and eleostearin aldehyde; alkatetraenals having 9 to 30 carbon atoms, preferably alkatetraenals having 9 to 25 carbon atoms, such as stearidonic aldehyde and arachidonic aldehyde; and alkapentaenals having 11 to 30 carbon atoms, preferably alkapentaenals having 11 to 25 carbon atoms, such as eicosapentaenoic aldehyde. When the aldehyde has a cis-trans isomer, the aldehyde includes both a cis isomer and a trans isomer. These aldehydes may be used alone or may be used in combination of two or more thereof.

Among the acetalized products of the aldehyde having a multiple bond, examples of the acetalized product of the aldehyde having a reactive carbon-carbon double bond include acetalized products of the aldehyde, specifically, 3-(1,3-dioxalan-2-yl)-3-methyl-1-propene which is an acetalized product of 2-methyl-3-butenal, and 3-(1,3-dioxalan-2-yl)-2-methyl-1-propene which is an acetalized product of 3-methyl-3-butenal.

Among the aldehydes having a multiple bond and the acetalized products of the aldehydes, examples of the aldehyde having a reactive carbon-carbon triple bond and the acetalized product thereof include an aldehyde having a carbon-carbon triple bond such as propionaldehyde, 2-butyn-1-al, and 2-pentyn-1-al, and an acetalized product of the aldehyde.

Among the aldehydes having a multiple bond and the acetalized products of the aldehyde, aldehydes having a reactive carbon-carbon double bond are preferred, and for example, one or more selected from acrolein, methacrolein, crotonaldehyde, 3-butenal, 2-methyl-2-butenal, 2-methyl-3-butenal, 2,2-dimethyl-3-butenal, 3-methyl-2-butenal, 3-methyl-3-butenal, 2-pentenal, 2-methyl-2-pentenal, 3-pentenal, 3-methyl-4-pentenal, 4-pentenal, 4-methyl-4-pentenal, 2-hexenal, 3-hexenal, 4-hexenal, 5-hexenal, 7-octenal, 2-ethylcrotonaldehyde, 3-(dimethylamino)acrolein, and 2,4-pentadienal are preferred. Among these, one or more selected from acrolein, methacrolein, crotonaldehyde, and 3-butenal are more preferred because of good reactivity at the time of copolymerization.

Examples of the monocarboxylic acid having a multiple bond, the salt of the monocarboxylic acid, the esterified product of the monocarboxylic acid, and the acid anhydride of the monocarboxylic acid include: carboxylic acids having a reactive carbon-carbon double bond, salts of the carboxylic acids, esterified products of the carboxylic acids, and acid anhydrides of the carboxylic acids, such as (meth)acrylic acid, sodium salt of (meth)acrylic acid, potassium salt of (meth)acrylic acid, methyl (meth)acrylate, ethyl (meth)acrylate, butyl (meth)acrylate, propyl (meth)acrylate, (meth) acrylic acid 2-hydroxylethyl, (meth)acrylic acid 2-hydroxylpropyl, (meth)acrylic acid 3-hydroxypropyl, (meth)acrylic acid 2-hydroxylbutyl, (meth)acrylic acid 3-hydroxylbutyl, (meth)acrylic acid 4-hydroxylbutyl, (meth)acrylic acid vinyl, 2-(trifluoromethyl) acrylic acid, methyl 2-trifluoromethylacrylate, ethyl 2-trifluoromethylacrylate, propyl 2-trifluoromethylacrylate, 2-butyl 2-trifluoromethylacrylate, 2-hydroxyethyl 2-trifluoromethylacrylate, vinyl 2-trifluoromethylacrylate, methyl cinnamate, vinyl cinnamate, methyl crotonate, vinyl crotonate, methyl 3-methyl-3-butenoate, vinyl 3-methyl-3-butenoate, methyl 4-pentenoate, vinyl 4-pentenoate, methyl 2-methyl-4-pentenoate, vinyl 2-methyl-4-pentenoate, methyl 5-hexenoate, vinyl 5-hexenoate, methyl 3,3-dimethyl-4-pentenoate, vinyl 3,3-dimethyl-4-pentenoate, methyl 7-octenoate, vinyl 7-octenoate, methyl trans-3-pentenoate, vinyl trans-3-pentenoate, methyl trans-4-decenoate, vinyl trans-4-decenoate, ethyl 3-methyl-3-butenoate, ethyl 4-pentenoate, ethyl 2-methyl-4-pentenoate, ethyl 5-hexenoate, ethyl 3,3-dimethyl-4-pentenoate, ethyl 7-octenoate, ethyl trans-3-pentenoate, ethyl trans-4-decenoate, methyl 10-undecenoate, vinyl 10-undecenoate, (meth)acrylic anhydride, 2-(trifluoromethyl) acrylic anhydride, cinnamic anhydride, crotonic anhydride, 3-methyl-3-butenoic anhydride, 4-pentenoic anhydride, 2-methyl-4-pentenoic anhydride, 5-hexenoic anhydride, 3,3-dimethyl-4-pentenoic anhydride, 7-octenoic anhydride, trans-3-pentenoic anhydride, trans-4-decenoic anhydride, and 10-undecenoic anhydride; and carboxylic acids having a reactive carbon-carbon triple bond and esterified products of the carboxylic acids, such as propiolic acid, methyl propiolic acid, ethyl propiolic acid, vinyl propiolic acid, tetrolic acid, methyl tetrolic acid, ethyl tetrolic acid, and vinyl tetrolic acid.

In the description herein, the term "(meth)acrylic acid" collectively means "acrylic acid" and "methacrylic acid".

Examples of the dicarboxylic acid having a multiple bond, the salt of the dicarboxylic acid, the esterified product of the dicarboxylic acid, and the acid anhydride of the dicarboxylic acid include dicarboxylic acids having a reactive carbon-carbon double bond, salts of the dicarboxylic acids, esterified products of the dicarboxylic acids, and acid anhydrides of the dicarboxylic acids, such as maleic acid, sodium maleate, potassium maleate, methyl maleate, dimethyl maleate, maleic anhydride, itaconic acid, methyl itaconate, dimethyl itaconate, itaconic anhydride, himic acid, methyl himic acid, dimethyl himic acid, and himic anhydride.

As the monocarboxylic acid having a multiple bond, the salt of the monocarboxylic acid, the esterified product of the monocarboxylic acid, the monocarboxylic acid anhydride, the dicarboxylic acid having a multiple bond, the salt of the dicarboxylic acid, the esterified product of the dicarboxylic acid, and the acid anhydride of the dicarboxylic acid, compounds having a reactive carbon-carbon double bond are preferred, and among them, one or more selected from methyl (meth)acrylate, ethyl (meth)acrylate, butyl (meth) acrylate, vinyl (meth)acrylate, (meth)acrylic acid anhydride, 2-(trifluoromethyl)acrylic acid anhydride, cinnamic anhydride, crotonic anhydride, methyl maleate, dimethyl maleate, maleic anhydride, methyl itaconate, dimethyl itaconate, and itaconic anhydride are more preferred because of good reactivity at the time of copolymerization.

Among the amine compounds having a multiple bond, examples of the amine compounds having a reactive carbon-carbon double bond include allylamine, 3-butenylamine, 4-pentenylamine, 5-hexenylamine, 6-heptenylamine, 7-octenylamine, oleylamine, 2-methylallylamine, 4-aminostyrene, 4-vinylbenzylamine, 2-allylglycine, S-allylcysteine, α-allylalanine, 2-allylaniline, geranylamine, vigabatrin, 4-vinylaniline, and 4-vinyloxyaniline. Among these, one or more selected from allylamine, 3-butenylamine, and 4-pentenylamine are preferred because of good reactivity at the time of copolymerization.

[Production Method (4) of Modified Conjugated Diene Rubber]

The production method (4) is a method in which a modifying compound capable of reacting with a polymerization active end is added to a polymerized product (unmodified conjugated diene rubber) of an unmodified conjugated diene monomer having the polymerization active end before a polymerization terminator is added. The unmodified conjugated diene rubber having a polymerization active end can be obtained, for example, by polymerizing a conjugated diene monomer and, if necessary, another monomer other than the conjugated diene by an emulsion polymerization method, a solution polymerization method, or the like, in the same manner as in the production method (1).

Examples of the modifying compound which can be used in the production method (4) include modifying agents such as dimethyldiethoxysilane, tetramethoxysilane, tetraethoxysilane, 3-aminopropyltriethoxysilane, tetraglycidyl-1,3-bisaminomethylcyclohexane, 2,4-tolylenediisocyanate, carbon dioxide, ethylene oxide, succinic anhydride, boronic acid esters such as triethyl borate, tripropyl borate, triisopropyl borate and tributyl borate, boronic acid anhydrides such as a boronic acid anhydride group and phenylboronic acid anhydride, 4,4'-bis(diethylamino)benzophenone, N-vinylpyrrolidone, N-methylpyrrolidone, 4-dimethylaminobenzylideneaniline, and dimethylimidazolidinone, and other modifying agents described in JP 2011-132298 A.

In the case where polymerization is performed using, for example, an organic alkali metal compound, the amount of the modifying compound used in the production method (4) is preferably in the range of 0.01 to 100 mol equivalent to the amount of the organic alkali metal compound. The reaction temperature is usually in the range of −80 to 150° C., preferably 0 to 100° C., and more preferably 10 to 90° C.

Alternatively, after introducing a hydrogen bonding functional group into the unmodified conjugated diene rubber by adding the modifying compound before adding the polymerization terminator, another hydrogen bonding functional group may be introduced into the polymer by further adding a modifying compound capable of reacting with the functional group.

The modified conjugated diene rubber may contain a unit derived from a monomer other than the conjugated diene monomer and the radical polymerizable compound having a hydrogen bonding functional group as long as the effect of the present invention is not impaired. Examples of the other monomer include a copolymerizable ethylenically unsaturated monomer and an aromatic vinyl compound, and specific compounds and contents thereof are the same as those described above.

The method for producing the modified conjugated diene rubber is not particularly limited, but from the viewpoint of productivity, the modified conjugated diene rubber is preferably produced by the production method (1), (2), or (3), more preferably produced by the production method (1) or (3), and still more preferably produced by the production method (1).

[Physical Properties of Liquid Conjugated Diene Rubber]

From the viewpoint of improving adhesiveness when the emulsion composition is used as an adhesive, the weight average molecular weight (Mw) of the liquid conjugated diene rubber is preferably 2,000 or more, more preferably 5,000 or more, still more preferably 10,000 or more, even more preferably 15,000 or more, yet still more preferably 20,000 or more, and particularly preferably 25,000 or more. In addition, from the viewpoint of maintaining the adhesive force for a long period of time, it is further preferably 35,000 or more. On the other hand, from the viewpoint of improving the handleability of the liquid conjugated diene rubber, the weight average molecular weight is preferably 150,000 or less, more preferably 120,000 or less, still more preferably 100,000 or less, and even more preferably 75,000 or less.

Mw and Mn of the liquid conjugated diene rubber are a weight average molecular weight and a number average molecular weight in terms of polystyrene obtained from measurement of gel permeation chromatography (GPC).

The molecular weight distribution (Mw/Mn) of the liquid conjugated diene rubber is preferably 1.0 to 5.0, more preferably 1.0 to 3.0, still more preferably 1.0 to 2.0, and even more preferably 1.0 to 1.3. When the Mw/Mn is within the above range, the variation in viscosity of the liquid conjugated diene rubber is small, and the handling is easy. The molecular weight distribution (Mw/Mn) means the ratio of the weight average molecular weight (Mw) to the number average molecular weight (Mn) in terms of standard polystyrene determined by GPC measurement.

The glass transition temperature (Tg) of the liquid conjugated diene rubber may vary depending on the vinyl content of the conjugated diene unit, the type of the conjugated diene, the content of the unit derived from a monomer other than the conjugated diene, and the like, but is preferably −100 to 10° C., more preferably −100 to −10° C., and still more preferably −100 to −20° C. When the Tg is within the above range, an increase in viscosity can be suppressed, and handling becomes easy.

The glass transition temperature (Tg) of the liquid conjugated diene rubber means a value measured by differential scanning calorimetry (DSC), and can be specifically measured by a method described in Examples.

<Diluent Having Vapor Pressure at 20° C. of 10 Pa or Less>

In the present invention, a diluent having a vapor pressure at 20° C. of 10 Pa or less is used. Specific examples of the diluent include, but are not particularly limited to, oil and low viscosity liquid rubber.

In the present invention, the low viscosity liquid rubber refers to a rubber having a melt viscosity measured at 38° C. of less than 30 Pa·s, and is different from the liquid conjugated diene rubber in terms of melt viscosity.

Further, in the description herein, a "diluent having a vapor pressure at 20° C. of 10 Pa or less" may be simply referred to as a "diluent".

When the vapor pressure of the diluent at 20° C. exceeds 10 Pa, it becomes difficult to stabilize the emulsion. In addition, when the emulsion composition of the present invention is used as an adhesive, coating unevenness is likely to occur, and thus the adhesiveness may decrease. Furthermore, contamination of production equipment may occur during production. From these viewpoints, the vapor pressure of the diluent at 20° C. is preferably 5.0 Pa or less, more preferably 1.0 Pa or less, still more preferably $1.0\times10^{-1}$ Pa or less, even more preferably $1.0\times10^{-2}$ Pa or less, and yet still more preferably $1.0\times10^{-3}$ Pa or less. On the other hand, the vapor pressure of the diluent at 20° C. is preferably $1.0\times10^{-8}$ Pa or more.

In the present invention, the vapor pressure at 20° C. of the diluent having a vapor pressure at 20° C. of less than $10^3$ Pa is a value calculated from an optimum curve obtained by applying the Antoine equation to a measurement value measured by a gas flow method.

In addition, the vapor pressure at 20° C. of a diluent having a vapor pressure at 20° C. exceeding $10^3$ Pa is a value directly measured using a static method.

[Oil]

As the diluent, for example, a nonvolatile oil is preferably used. The oil is not particularly limited as long as it has a vapor pressure at 20° C. of 10 Pa or less and is compatible with the liquid conjugated diene rubber, and examples thereof include natural oils and synthetic oils. Examples of the natural oil include mineral oils and vegetable oils.

Examples of the mineral oil include a paraffinic mineral oil, an aromatic mineral oil, and a naphthenic mineral oil, which are obtained by a general refining method such as solvent refining or hydrorefining, a wax (gas-to-liquid wax) produced by a Fischer-Tropsch process or the like, and a mineral oil produced by isomerizing a wax.

Examples of commercially available products of the paraffinic mineral oils include "Diana Process Oil" series manufactured by Idemitsu Kosan Co., Ltd., "Super Oil" series manufactured by ENEOS Corporation, and "SUNPAR150" manufactured by Japan Sun Oil Co., Ltd.

Further, examples of commercially available products of the naphthenic mineral oils include "SUNTHENE250J" manufactured by Japan Sun Oil Co., Ltd.

Examples of the vegetable oil include linseed oil, camellia oil, macadamia nut oil, corn oil, mink oil, olive oil, avocado oil, camellia kissi seed oil, castor oil, safflower oil, jojoba oil, sunflower oil, almond oil, rapeseed oil, sesame oil, soybean oil, peanut oil, cottonseed oil, coconut oil, palm kernel oil, and rice bran oil.

Examples of the synthetic oil include a hydrocarbon-based synthetic oil, an ester-based synthetic oil, and an ether-based synthetic oil. Examples of the hydrocarbon-based synthetic oil include α-olefin oligomers such as polybutene, polyisobutylene, 1-octene oligomer, 1-decene oligomer, and an ethylene-propylene copolymer or hydrogenated products thereof, alkylbenzene, and alkylnaphthalene. Examples of the ester-based synthetic oils include triglycerin fatty acid esters, diglycerin fatty acid esters, monoglycerin fatty acid esters, monoalcohol fatty acid esters, and polyhydric alcohol fatty acid esters. Examples of the ether-based synthetic oil include polyoxyalkylene glycol and polyphenyl ether. Examples of commercially available products of the synthetic oil include "Linearene" series manufactured by Idemitsu Kosan Co., Ltd., and "FGC32", "FGC46", and "FGC68" manufactured by ANDEROL.

As the oil, one kind selected from the natural oils and the synthetic oils may be used, or two or more kinds of the natural oils, two or more kinds of the synthetic oils, or one or more kinds of each of the natural oils and the synthetic oils may be mixed.

The flash point of the oil used in the present invention is preferably 70° C. or higher, more preferably 100° C. or higher, still more preferably 130° C. or higher, and even more preferably 140° C. or higher, from the viewpoint of safety. The upper limit of the flash point of the oil is not particularly limited, but is preferably 320° C. or lower.

[Low Viscosity Liquid Rubber]

As the diluent, it is also preferred to use a low viscosity liquid rubber. The low viscosity liquid rubber is not particularly limited as long as the melt viscosity measured at 38° C. is less than 30 Pa·s and the vapor pressure at 20° C. is 10 Pa or less. More specific examples thereof include a liquid butadiene rubber, a liquid isoprene rubber, and a liquid farnesene rubber, and these may be a homopolymer or a copolymer. In particular, for dilution, a low viscosity is preferred, and a low molecular weight liquid rubber is preferred, and a liquid butadiene rubber and a liquid farnesene rubber are particularly preferred.

When the low viscosity liquid rubber is a liquid butadiene rubber, the weight average molecular weight is preferably 500 to 10,000, more preferably 700 to 7,000, and still more preferably 800 to 6,000. On the other hand, when the low viscosity liquid rubber is a liquid farnesene rubber, the weight average molecular weight is preferably 1,000 to 80,000, preferably 1,000 to 50,000, more preferably 1,000 to 30,000, and still more preferably 1,000 to 10,000.

When the weight average molecular weight of the low viscosity liquid rubber is within the above range, the stability of the emulsion is further improved, and the handleability of the emulsion composition is also improved.

The weight average molecular weight of the low viscosity liquid rubber is a weight average molecular weight in terms of polystyrene obtained from measurement of gel permeation chromatography (GPC).

In the present invention, from the viewpoint of improving the stability of the emulsion and the adhesiveness of the adhesive using the emulsion composition, the diluent is preferably a naphthenic mineral oil or a low viscosity liquid rubber, and more preferably a naphthenic mineral oil or a liquid butadiene rubber.

<Surfactant>

The surfactant used in the present invention is not particularly limited, and examples thereof include a cationic surfactant, an anionic surfactant, a nonionic surfactant, and an amphoteric surfactant. Among these, from the viewpoint of improving the stability of the emulsion, a nonionic surfactant is preferred. These may be used alone or may be used in combination of two or more thereof.

Examples of the cationic surfactant include alkylammonium acetates, alkyldimethylbenzylammonium salts, alkyltrimethylammonium salts, dialkyldimethylammonium salts, alkylpyridinium salts, oxyalkylene alkylamines, and polyoxyalkylene alkylamines. These cationic surfactants may be used alone, or two or more of them may be used in combination as necessary.

Examples of the anionic surfactant include carboxylates such as fatty acid soaps, sulfuric ester salt such as higher alcohol sulfates, higher alkylpolyalkylene glycol ether sulfates, sulfates of styrenated phenol-alkylene oxide adducts, sulfates of alkylphenol-alkylene oxide adducts, sulfates such as sulfated oils, sulfated fatty acid esters, sulfated fatty acids and sulfated olefins, etc., alkylbenzenesulfonates, alkylnaphthalenesulfonates, naphthalenesulfonates, condensation products of naphthalene sulfonic acid, etc., sulfonates such as α-olefinsulfonates, paraffinsulfonates and sulfosuccinic acid diester salts, and higher alcohol phosphates. These anionic surfactants may be used alone, or two or more of them may be used in combination as necessary.

Examples of commercially available products of the anionic surfactants include "PLYSURF A210B" manufactured by DKS Co., Ltd., and "Phosphanol RD-720N" manufactured by TOHO Chemical Industry Co., Ltd.

Examples of the nonionic surfactant include polyoxyalkylene type nonionic surfactants such as higher alcohol alkylene oxide adducts, alkylphenol alkylene oxide adducts, styrenated phenol alkylene oxide adducts, fatty acid alkylene oxide adducts, polyhydric alcohol aliphatic ester alkylene oxide adducts, higher alkylamine alkylene oxide adducts, and fatty acid amide alkylene oxide adducts; and polyhydric alcohol type nonionic surfactants such as alkyl glycoxides and sucrose fatty acid esters. These nonionic surfactants may be used alone, or two or more of them may be used in combination as necessary.

Examples of commercially available products of the nonionic surfactants include "ADEKA TOL PC-6", "ADEKA TOL PC-8", "ADEKA TOL PC-10", and "ADEKA TOL TN-100" manufactured by Adeka Corporation, and polyoxyethylene alkyl ethers (trade names "Pegnol TE-10A", "Pegnol L-9A", and "Pegnol TH-8") manufactured by TOHO Chemical Industry Co., Ltd.

The HLB (Hydrophilic-Lipophilic Balance) value of the nonionic surfactant is an index indicating the balance between hydrophilicity and lipophilicity, and is represented by a value from 0 to 20. In the present invention, a value calculated by the following formula (I) according to the Griffin's method is used.

$$\text{HLB value} = 20 \times (\text{total sum of the formula amount of the hydrophilic portion})/(\text{molecular weight}) \quad (I)$$

For identification of the nonionic surfactant, the molecular weight and the structural unit were detected and measured using mass spectrum, and the structure was detected and measured using $^{1}H$ and $^{13}C$-NMR, and the structure can be identified based on these. Therefore, the HLB value can be determined using the formula (I) based on the identified information. Examples of the method for separating the nonionic surfactant from the emulsion composition include a method in which the nonionic surfactant is fractionated and collected by reversed-phase liquid chromatography.

<Composition of Emulsion Composition>

The content of the liquid conjugated diene rubber in the emulsion composition of the present invention is preferably 1% by mass or more, more preferably 2% by mass or more, and still more preferably 4% by mass or more, and is preferably 50% by mass or less, more preferably 30% by mass or less, and still more preferably 20% by mass or less, with respect to the total amount of the emulsion composition, from the viewpoint of improving stability of the emulsion and from the viewpoint of improving adhesive force when the emulsion composition is used as an adhesive. When the content of the liquid conjugated diene rubber in the emulsion composition is within the above range, it is possible to prevent the viscosity of the emulsion composition from becoming extremely high while improving the stability of the emulsion.

The content of the diluent in the emulsion composition is preferably 1% by mass or more, more preferably 2% by mass or more, and still more preferably 4% by mass or more, and is preferably 50% by mass or less, more preferably 30% by mass or less, and still more preferably 20% by mass or less, with respect to the total amount of the emulsion composition. When the content of the diluent in the emulsion composition is within the above range, the viscosity of the emulsion composition can be prevented from becoming extremely high, and the production efficiency is improved. In addition, since the stability of the emulsion is improved, defects such as phase separation are less likely to occur over a long period of time after the production.

The content of the surfactant in the emulsion composition is preferably 1 part by mass or more, more preferably 3 parts by mass or more, and still more preferably 4 parts by mass or more with respect to 100 parts by mass of the total of the liquid conjugated diene rubber and the diluent. When the content of the surfactant is 1 part by mass or more, the stability of the emulsion can be improved. On the other hand, the amount of the surfactant is preferably 15 parts by mass or less, and more preferably 10 parts by mass or less, from the viewpoint of production cost.

The liquid conjugated diene rubber may be used alone or may be used in combination of two or more thereof. In addition, the diluent may be used alone or may be used in combination of two or more thereof. Further, the surfactant may be used alone or may be used in combination of two or more thereof.

Furthermore, the emulsion composition of the present invention may contain other components in addition to the liquid conjugated diene rubber, the diluent having a vapor pressure at 20° C. of 10 Pa or less, the surfactant, and water as long as the stability of the emulsion is not impaired.

Examples of the other components include other polymers, acids, basic compounds such as sodium hydroxide, antioxidants, curing agents, dispersants, pigments, dyes, adhesion aids, and carbon black.

Examples of the basic compound include sodium hydroxide, potassium hydroxide, sodium carbonate, and ammonia. Among these, from the viewpoint of stability and adhesiveness, sodium hydroxide and ammonia are preferred, and from the viewpoint of safety of workers, ammonia is preferably used.

When the emulsion composition contains other components, the content thereof is preferably 1,000 parts by mass or less, more preferably 100 parts by mass or less, still more preferably 10 parts by mass or less, and even more preferably 1 part by mass or less, with respect to 100 parts by mass of the liquid conjugated diene rubber. For example, when the emulsion composition contains a basic compound such as sodium hydroxide in the above range, the stability of the emulsion is further improved.

[Method for Producing Emulsion Composition]

The method for producing an emulsion composition of the present invention includes mixing the liquid conjugated diene rubber, the diluent, the surfactant, and water to produce an oil-in-water emulsion, and then not removing the diluent.

According to the production method of the present invention, since a diluent having a vapor pressure at 20° C. of 10 Pa or less is used, it is possible to obtain a highly stable emulsion composition more easily than in a conventional method while suppressing an increase in the viscosity of the emulsion composition.

Further, in the conventional method using a highly volatile solvent, a step of removing the solvent is required, but in the method of the present invention, it is possible to produce an emulsion composition without requiring the step of removing the solvent. That is, according to the production method of the present invention, the emulsion composition can be efficiently used for applications such as an adhesive without requiring a post-treatment step.

In the production method of the present invention, "not removing the diluent" means that there is no need to provide a step for removing the diluent.

The order in which the liquid conjugated diene rubber, the diluent, the surfactant, and water are mixed may be such that after the liquid conjugated diene rubber, the diluent, and the surfactant are mixed, water may be mixed therein. More preferably, the order of mixing is such that after the liquid conjugated diene rubber and the diluent are mixed to prepare a diluted solution, the surfactant is mixed into the diluted solution, and then water and, if necessary, a basic compound such as sodium hydroxide are added little by little while mixing. A method for producing an emulsion composition in which these orders are adopted is generally called a phase inversion emulsification method, and is a method in which an emulsifier is dissolved in an oil phase, water is added thereto while stirring, and a continuous phase is phase-inverted from the oil phase to an aqueous phase to form an O/W type emulsion. When water and, if necessary, a basic compound such as sodium hydroxide are mixed, the above-described phase inversion can be allowed to proceed slowly by mixing while adding these little by little, and as a result, the obtained emulsion composition becomes finer and has a small particle size distribution. In addition, in a case where a basic compound such as sodium hydroxide is added, it is preferred that the addition of the basic compound is completed before the above-described phase inversion is completed, from the viewpoint that the storage stability of the obtained emulsion composition can be further improved.

When the respective components are mixed in the order of mixing the liquid conjugated diene rubber, the diluent, and the surfactant, and then mixing water thereto, the mixing is preferably performed by a mechanical method. Examples of the mechanical method include methods using a kneader, a super mixer, and a twin-screw extruder, and these can be used alone or in combination. By using the above apparatus, an emulsion composition having a fine particle size can be obtained by applying a strong shearing.

When the order in which the liquid conjugated diene rubber and the diluent are mixed to prepare a diluted solution, the surfactant is mixed into the diluted solution, and then water and, if necessary, a basic compound such as sodium hydroxide are added little by little while mixing is employed, the mixing in each step is preferably performed by the method described below. That is, in the step of mixing the liquid conjugated diene rubber and the diluent to prepare a diluted solution and the step of mixing the surfactant with the obtained diluted solution, mixing is preferably performed using a kneader, a super mixer, and a twin-screw extruder. By using these apparatuses, a uniformly mixed liquid mixture can be relatively easily obtained with high productivity.

In the subsequent step of mixing water and, if necessary, a basic compound such as sodium hydroxide little by little, preferred examples of the mixing method include a method of mixing using a homogenizer, a homomixer, a disperser mixer, a colloid mill, a kneader, a planetary mixer, a super mixer, a high-pressure homogenizer, a twin-screw extruder, an ultrasonic emulsifier, and the like, and these can be used alone or in combination. By using the above apparatus, an emulsion composition having a fine particle size can be obtained by applying a strong shearing.

When water is added in the method for producing the emulsion composition, water may be added in one production process of the emulsion composition so that the content of the liquid conjugated diene rubber and the diluent in the emulsion composition is in the above-described preferred range. In a more preferred embodiment, the production process of the emulsion composition is divided into two or more processes, and the amount of water added is limited so that the liquid conjugated diene rubber and the diluent are contained at a high concentration in the first production process, and water is further added so that the contents of the liquid conjugated diene rubber and the diluent are appropriate as a final product in the second and subsequent production processes of the emulsion composition. By employing such a production process, the product quality of the finally obtained emulsion composition is easily stabilized. When this production process is employed, it is not always necessary to perform the first production process and the second and subsequent production processes at the same place, and an embodiment in which the high-concentration emulsion composition obtained in the first production process is transported to a place where the emulsion composition is actually used or the vicinity thereof, and then water is further added in the second and subsequent production processes of the emulsion composition so that the contents of the liquid conjugated diene rubber and the diluent become appropriate as a final product is also preferred. In this case, a high-concentration emulsion composition is preferred from the economical viewpoint because the transportation cost is relatively low.

According to the production method of the present invention, since the viscosity of the diluted solution can be reduced, when emulsification is performed by the mechanical method, an excessive load is not applied to the apparatus, and the rotational speed can be increased to provide sufficient shearing. From the above viewpoint, the viscosity of the diluted solution measured at 25° C. is preferably $1.0\times10^3$ Pa·s or less, more preferably $5.0\times10^2$ Pa·s or less, still more preferably $1.0\times10^2$ Pa·s or less, and most preferably $5.0\times10$ Pa·s or less. When the viscosity is within the above range, the viscosity can be made sufficiently low, and thus the production becomes easy.

The viscosity of the diluted solution means a viscosity of a composition obtained by mixing only the conjugated diene rubber and the diluent, which is measured at 25° C. using a Brookfield viscometer (B-type viscometer). The rotor and the rotational speed at the time of measurement are appropriately set so as to be close to the full scale.

<Use of Emulsion Composition>

Since the emulsion composition of the present invention has high emulsion stability as described above, it exhibits excellent adhesiveness when used, for example, as an adhesive component of an adhesive. When the emulsion composition of the present invention is used as an adhesive component, its use is not particularly limited, and examples thereof include a use for bonding a fiber and a rubber.

[Fiber]

The fiber as an adherend is not particularly limited, but is preferably a hydrophilic fiber from the viewpoint of affinity with the adhesive using the emulsion composition. In the present invention, the "fiber" includes not only a single fiber and a long fiber but also forms such as a nonwoven fabric, a woven fabric, a knitted fabric, a felt, and a sponge.

Examples of the hydrophilic synthetic fiber include a synthetic fiber composed of a thermoplastic resin having a hydrophilic functional group such as a hydroxy group, a carboxy group, a sulfonic acid group, and an amino group and/or a hydrophilic bond such as an amide bond.

Specific examples of such thermoplastic resins include polyvinyl alcohol-based resins, polyamide-based resins [aliphatic polyamides such as polyamide 6, polyamide 66, polyamide 11, polyamide 12, polyamide 610, polyamide 612, and polyamide 9C (polyamide composed of nonanediamine and cyclohexanedicarboxylic acid); semi-aromatic polyamides synthesized from aromatic dicarboxylic acids and aliphatic diamines such as polyamide 9T (polyamide composed of nonanediamine and terephthalic acid); wholly aromatic polyamides synthesized from aromatic dicarboxylic acids and aromatic diamines such as polyparaphenylene terephthalamide], and polyacrylamide-based resins.

Among these, polyvinyl alcohol-based resins and polyamide-based resins are preferred. The hydrophilic synthetic fibers may be used alone or may be used in combination of two or more thereof. In addition, these hydrophilic synthetic fibers may be further subjected to a hydrophilization treatment described later in order to further increase the hydrophilicity.

Examples of the hydrophilic natural fibers include natural cellulose fibers such as wood pulp such as kraft pulp and non-wood pulp such as cotton pulp and straw pulp.

Examples of the hydrophilic regenerated fibers include regenerated cellulose-based fibers such as rayon, lyocell, cupra, and polynosic.

Each of these natural fibers and regenerated fibers may be used alone or may be used in combination of two or more thereof. In addition, these hydrophilic natural fibers and regenerated fibers may be further subjected to a hydrophilization treatment described later in order to further increase the hydrophilicity.

The hydrophilic fiber may have at least a hydrophilic surface, and may be, for example, a fiber obtained by subjecting a surface of a hydrophobic fiber to a hydrophilic treatment, a core-sheath type composite fiber in which a hydrophobic resin is used as a core portion and a hydrophilic resin is used as a sheath portion, or the like. With respect to examples of the hydrophilic resin constituting the sheath portion, the description on the hydrophilic synthetic fiber is cited. Examples of the hydrophobic fiber made of a hydrophobic resin include a polyolefin-based fiber such as polyethylene and polypropylene, a polyester-based fiber such as polyethylene terephthalate, and a wholly aromatic polyester-based fiber, and among these, a polyester-based fiber is preferred.

The hydrophilic treatment is not particularly limited as long as it is a treatment of chemically or physically imparting a hydrophilic functional group to the fiber surface, and can be performed, for example, by a method of modifying the hydrophobic fiber made of the hydrophobic resin with a compound containing a hydrophilic functional group such as an isocyanate group, an epoxy group, a hydroxy group, an amino group, an ether group, an aldehyde group, a carbonyl group, a carboxy group, and a urethane group or a derivative thereof, or a method of modifying the surface by electron beam irradiation.

As the fiber used in the present invention, from the viewpoint of compatibility between the emulsion composition and the fiber, a synthetic fiber and a regenerated fiber are preferred, and among them, one or more selected from a polyvinyl alcohol-based fiber using a polyvinyl alcohol-based resin as a raw material, a regenerated cellulose-based fiber, a polyester-based fiber, and a polyamide-based fiber are preferred. Among them, a polyester-based fiber subjected to a hydrophilic treatment is most preferred.

[Method of Adhering Emulsion Composition to Fiber]

A method of adhering the emulsion composition to the fiber is not particularly limited, and is preferably performed by one or more selected from dipping, a roll coater, an oiling roller, an oiling guide, nozzle (spray) coating, brush coating, and the like.

The adhesion amount of the emulsion composition is preferably 0.01 parts by mass or more, more preferably 0.1 parts by mass or more, and still more preferably 1 part by mass or more, with respect to 100 parts by mass of the fiber, from the viewpoint of improving the adhesiveness between the fiber and the rubber, and is preferably 10 parts by mass or less, more preferably 5 parts by mass or less, and still more preferably 3 parts by mass or less, from the viewpoint of the balance between the production cost and the effect.

After the emulsion composition of the present invention is adhered to the fiber, the fiber is preferably conditioned at room temperature of about 20° C. for about 3 days to 10 days. In some cases, after the emulsion composition is adhered to the fiber, the fiber may be subjected to a heat treatment.

The heat treatment is preferably performed at a treatment temperature of 100 to 200° C. for a treatment time of 0.1 seconds to 2 minutes. Since the liquid conjugated diene rubber contained in the emulsion composition has a reactive multiple bond, the heat treatment in the presence of oxygen is preferably performed at 200° C. or lower, and more preferably 175° C. or lower. When the temperature of the heat treatment is within the above range, the adhesive force can be improved without reducing the amount of the reactive multiple bond in the liquid conjugated diene rubber, and further, the deterioration of the fiber is also suppressed, and the quality such as coloring becomes good.

[Rubber]

The rubber to be bonded to the fiber is not particularly limited, and examples thereof include NR (natural rubber), IR (polyisoprene rubber), BR (polybutadiene rubber), SBR (styrene-butadiene rubber), NBR (nitrile rubber), EPM (ethylene-propylene copolymer rubber), EPDM (ethylene-propylene-non-conjugated diene copolymer rubber), IIR (butyl rubber), halogenated butyl rubber, and CR (chloroprene rubber). Among these, NR, BR, and SBR are more preferably used. These rubbers may be used alone or may be used in combination of two or more thereof.

As a method for producing a rubber molded body by bonding the fiber and the rubber, for example, a molded body in which the fiber and the rubber are bonded via the emulsion composition can be obtained by adhering the emulsion composition to the fiber, embedding the fiber in the unvulcanized rubber component, and vulcanizing the rubber component.

EXAMPLES

Hereinafter, the present invention will be more specifically described with reference to Examples and the like, but the present invention is not limited by such Examples and the like.

<Production of Liquid Conjugated Diene Rubber>

Production Example 1: Production of Modified Conjugated Diene Rubber (A-1)

A sufficiently dried 5 L autoclave was nitrogen-substituted, 1260 g of hexane and 36.3 g of n-butyllithium (17% by mass hexane solution) were charged, the temperature was raised to 50° C., and then 1260 g of butadiene was successively added while controlling the polymerization temperature to 50° C. under stirring conditions, and the mixture was polymerized for 1 hour. Thereafter, methanol was added to terminate the polymerization reaction, thereby obtaining a polymer solution. Water was added to the resulting polymer solution and stirred, and the polymer solution was washed with water. Stirring was finished, and after it was confirmed that the polymer solution phase and the aqueous phase were separated from each other, water was separated. The polymer solution after the washing was dried in vacuum at 70° C. for 24 hours to obtain an unmodified liquid polybutadiene (A'-1).

Subsequently, 500 g of the obtained unmodified liquid polybutadiene (A'-1) was charged into a nitrogen-substituted autoclave having a volume of 1 L, 25 g of maleic anhydride and 0.5 g of N-phenyl-N'(1,3-dimethylbutyl)-p-phenylenediamine (trade name "NOCRAC 6C", manufactured by Ouchi Shinko Chemical Industrial Co., Ltd.) were added thereto, and the mixture was reacted at 170° C. for 24 hours to obtain a maleic anhydride-modified liquid polybutadiene. 8.5 g of methanol was added to 525 g of the obtained maleic anhydride-modified liquid polybutadiene, and the mixture was reacted at 80° C. for 6 hours to obtain a monomethyl maleate-modified liquid polybutadiene (A-1).

Production Example 2: Production of Modified Conjugated Diene Rubber (A-2)

A modified conjugated diene rubber (A-2) was produced in the same manner as in Production Example 1, except that 1260 g of hexane and 23.6 g of n-butyllithium (17% by mass hexane solution) were charged, the temperature was raised to 50° C., and then 1260 g of butadiene was successively added while controlling the polymerization temperature to 50° C. under stirring conditions.

<Production of Low Viscosity Liquid Rubber>

Production Example 3: Production of Low Viscosity Liquid Butadiene Rubber (B-1)

A sufficiently dried 5 L autoclave was nitrogen-substituted, 1260 g of hexane and 166 g of n-butyllithium (17% by mass hexane solution) were charged, the temperature was raised to 50° C., and then 1260 g of butadiene was successively added while controlling the polymerization temperature to 50° C. under stirring conditions, and the mixture was polymerized for 1 hour. Thereafter, methanol was added to terminate the polymerization reaction, thereby obtaining a polymer solution. Water was added to the resulting polymer solution and stirred, and the polymer solution was washed with water. Stirring was finished, and after it was confirmed that the polymer solution phase and the aqueous phase were separated from each other, water was separated. The polymer solution after the washing was dried in vacuum at 70° C. for 24 hours to obtain a low viscosity liquid butadiene rubber (B-1).

In addition, the measurement method and calculation method of each physical property of the modified conjugated diene rubber or the like are as follows. The results are shown in Table 1.

<Method for Measuring Weight Average Molecular Weight, Number Average Molecular Weight, and Molecular Weight Distribution>

The Mw, Mn, and Mw/Mn of the modified conjugated diene rubber or the like were obtained as values in terms of standard polystyrene by gel permeation chromatography (GPC). The measurement apparatus and conditions are as follows.

Apparatus: GPC apparatus "GPC8020" manufactured by Tosoh Corp oration
Separation column: "TSKgelG4000HXL" manufactured by Tosoh Corporation
Detector: "RI-8020" manufactured by Tosoh Corporation
Eluent: tetrahydrofuran
Eluent flow rate: 1.0 mL/min
Sample concentration: 5 mg/10 mL
Column temperature: 40° C.

<Method for Measuring Melt Viscosity>

The melt viscosity at 38° C. of the modified conjugated diene rubber or the like was measured with a Brookfield viscometer (manufactured by BROOKFIELD ENGINEERING LABS. INC.).

<Method for Measuring Glass Transition Temperature>

10 mg of the modified conjugated diene rubber was collected on an aluminum pan, and a thermogram was measured under a temperature rise rate condition of 10°

C./min by differential scanning calorimetry (DSC), and the value of the peak top of the DDSC was taken as the glass transition temperature.

<Average Number of Hydrogen Bonding Functional Groups Per Molecule>

The average number of hydrogen bonding functional groups per molecule of the modified conjugated diene rubber was calculated from the equivalent amount (g/eq) of the hydrogen bonding functional group of the modified conjugated diene rubber and the number average molecular weight Mn in terms of styrene by the following equation.

Average number of hydrogen bonding functional groups per molecule=[(number average molecular weight (Mn))/(molecular weight of styrene unit)×(average molecular weight of conjugated diene and monomer unit other than conjugated diene contained as necessary)]/(equivalent amount of hydrogen bonding functional group)

The method for calculating the equivalent amount of the hydrogen bonding functional group can be appropriately selected depending on the type of the hydrogen bonding functional group.

The average number of hydrogen bonding functional groups per molecule of the modified conjugated diene rubber was calculated by obtaining the acid value of the modified conjugated diene rubber and calculating the equivalent amount (g/eq) of the hydrogen bonding functional group from the acid value.

The sample after the modification reaction was washed four times with methanol (5 mL with respect to 1 g of the sample) to remove an impurity such as an antioxidant, and then the sample was dried under reduced pressure at 80° C. for 12 hours. To 3 g of the sample after the modification reaction, 180 mL of toluene and 20 mL of ethanol were added and dissolved, and then neutralized and titrated with an ethanol solution of 0.1N potassium hydroxide, and the acid value was obtained from the following equation.

$$\text{Acid value (mgKOH/g)}=(A-B)\times F\times 5.611/S$$

A: Dropping amount (mL) of the ethanol solution of 0.1N potassium hydroxide required for neutralization B: Dropping amount (mL) of the ethanol solution of 0.1N potassium hydroxide in the blank not containing the sample F: Titer of the ethanol solution of 0.1N potassium hydroxide S: Mass (g) of the weighed sample From the acid value, the mass of the hydrogen bonding functional group contained in 1 g of the modified conjugated diene rubber was calculated by the following equation, and further, the mass other than the functional group contained in 1 g of the modified conjugated diene rubber (polymer main chain mass) was also calculated by the following equation. Then, the equivalent amount (g/eq) of the hydrogen bonding functional group was calculated by the following equation.

[Mass of hydrogen bonding functional group per 1 g]=[acid value]/[56.11]×[molecular weight of hydrogen bonding functional group]/1000

[Mass of polymer main chain per 1 g]=1−[mass of hydrogen bonding functional group per 1 g]

[Equivalent amount of hydrogen bonding functional group]=[mass of polymer main chain per 1 g]/([mass of hydrogen bonding functional group per 1 g]/[hydrogen bonding functional group molecular weight])

TABLE 1

| Liquid conjugated rubber | Modified group | Mw (×10$^3$) | Mn (×10$^3$) | Molecular weight distribution Mw/Mn | Melt viscosity at 38° C. (Pa · s) | Glass transition temperature (° C.) | Vinyl content (mol %) | Average number of hydrogen bonding functional group per molecule |
|---|---|---|---|---|---|---|---|---|
| A-1 | Monomethyl maleate group | 31 | 29 | 1.07 | 197 | −88 | 10 | 7 |
| A-2 | Monomethyl maleate group | 52 | 45 | 1.14 | 2016 | −87 | 10 | 12 |

The components used in Examples and Comparative Examples are as shown in Table 2 and Table 3.

TABLE 2

| | | Diluent or Organic solvent | | | | |
|---|---|---|---|---|---|---|
| | | Product name | Type | Vapor pressure at 20° C. (Pa) | Melt viscosity at 38° C. (Pa · s) | Weight average molecular weight |
| Example | 1 | SUNTHENE250J | Naphthenic oil | 1.0 × 10$^{-1}$ | — | — |
| | 2 | SUNTHENE250J | Naphthenic oil | 1.0 × 10$^{-1}$ | — | — |
| | 3 | Low viscosity liquid butadiene rubber (B-1) | Liquid butadiene rubber | <1.0 × 10$^{-7}$ | 0.6 | 5,500 |
| | 4 | Low viscosity liquid butadiene rubber | Liquid butadiene | <1.0 × 10$^{-7}$ | 0.6 | 5,500 |

TABLE 2-continued

| | | Diluent or Organic solvent | | | | |
|---|---|---|---|---|---|---|
| | | Product name | Type | Vapor pressure at 20° C. (Pa) | Melt viscosity at 38° C. (Pa · s) | Weight average molecular weight |
| | | (B-1) | rubber | | | |
| | 5 | SUNPAR 150 | Paraffinic oil | $1.0 \times 10^{-2}$ | — | — |
| | 6 | SUNPAR 150 | Paraffinic oil | $1.0 \times 10^{-2}$ | — | — |
| | 7 | SUNTHENE250J | Naphthenic oil | $1.0 \times 10^{-1}$ | — | — |
| | 8 | SUNTHENE250J | Naphthenic oil | $1.0 \times 10^{-1}$ | — | — |
| Comparative | 1 | — | — | | | |
| Example | 2 | Toluene | Organic solvent | $2.9 \times 10^{3}$ | — | — |
| | 3 | Toluene | Organic solvent | $2.9 \times 10^{3}$ | — | — |

Note 1)
"SUNTHENE250J" and "SUNPAR150" are manufactured by Japan Sun Oil Co., Ltd.

TABLE 3

| | | Surfactant | | |
|---|---|---|---|---|
| | | Product name | Type | HLB |
| Example | 1 | TE-10A | Nonionic | 14.1 |
| | 2 | TE-10A | Nonionic | 14.1 |
| | 3 | TE-10A | Nonionic | 14.1 |
| | 4 | TE-10A | Nonionic | 14.1 |
| | 5 | TN-100 | Nonionic | 13.8 |
| | 6 | TN-100 | Nonionic | 13.8 |
| | 7 | TE-10A | Nonionic | 14.1 |
| | 8 | TE-10A | Nonionic | 14.1 |
| Comparative | 1 | TE-10A | Nonionic | 14.1 |
| Example | 2 | TE-10A | Nonionic | 14.1 |
| | 3 | TE-10A | Nonionic | 14.1 |

Note
1) "TE-10A" is manufactured by TOHO Chemical Industry Co., Ltd.
Note
2) "TN-100" is manufactured by Adeka Corporation The vapor pressures of the diluents at 20° C. in Table 2 and the HLB values of the surfactants in Table 3 were measured according to the following methods.

[Vapor Pressure of Diluent at 20° C.]

The vapor pressures of the synthetic oils and the mineral oils at 20° C. were calculated by calculating a constant A, a constant B, and a constant C of the Antoine equation: log 10P=A−(B/(T+C)) based on the measurement values obtained by the gas flow method.

The vapor pressures of toluene at 20° C. were directly measured by the static method.

[HLB Value of Surfactant]

For identification of the nonionic surfactant, the molecular weight and the structural unit were detected and measured using mass spectrum, and the structure was detected and measured using $^{1}$H and $^{13}$C-NMR, and the structure was identified based on these. Based on the identified information, the HLB value was obtained using the following formula (I) according to the Griffin's method.

$$HLB=20\times(\text{total sum of the formula amount of the hydrophilic portion})/(\text{molecular weight}) \tag{I}$$

Example 1; Preparation of Emulsion

A modified conjugated diene rubber (A-1) as a liquid conjugated diene rubber and a naphthene oil (trade name "SUNTHENE250J" manufactured by Japan Sun Oil Company Ltd., vapor pressure at 20° C.: $1.0\times10^{-1}$ Pa) as a diluent (oil) having a vapor pressure at 20° C. of 10 Pa or less were mixed at a proportion shown in Table 4, and the mixture was stirred for 24 hours in a state of being heated to 50° C. to prepare 300 g of an oil agent diluted solution of the modified conjugated diene rubber (A-1).

Next, 18 g of polyoxyethylene alkyl ether (trade name "TE-10A", manufactured by TOHO Chemical Industry Co., Ltd., HLB value: 14.1) as a surfactant and 0.6 g of a 50% by mass sodium hydroxide aqueous solution were added to the oil agent diluted solution, and the mixture was stirred for 10 minutes. Subsequently, 210 g of water was added little by little while stirring, and stirring was performed for 60 minutes, thereby obtaining an emulsion composition (E-1) of the modified conjugated diene rubber (A-1).

Examples 2 to 4, 7 and 8, and Comparative Examples 1 to 3; Preparation of Emulsion Compositions Emulsion compositions of Examples 2 to 4, 7 and 8, and Comparative Examples 1 to 3 were prepared in the same manner as in Example 1, except that the mix proportion of each component was as shown in Table 4.

Examples 5 and 6; Preparation of Emulsion Compositions

Emulsion compositions of Examples 5 and 6 were prepared in the same manner as in Example 1, except that the mix proportion of each component was as shown in Table 4, and a primary alcohol ethoxylate (trade name "TN-100", manufactured by Adeka Corporation, HLB: 13.8) was used as a surfactant.

[Evaluation]

<Ease of Production (Viscosity at the time of Dilution)>

In Examples and Comparative Examples, the viscosity of a diluted solution immediately after mixing a liquid conjugated diene rubber and a diluent was measured by a rotary B-type viscometer (rotational speed of 100 rpm). The measurement was performed at room temperature (25° C.). The lower the viscosity, the easier the production.

In the present invention, "ease of production" means that an emulsion composition having excellent stability can be easily produced, and specifically means that when a liquid conjugated diene rubber and a diluent are mixed, the viscosity does not become excessively high, and the handleability and the ease of production are excellent.

<Stability of Emulsion Composition>

After the preparation, the emulsion compositions of Examples and Comparative Examples were placed in sample bottles and allowed to stand at room temperature (25° C.) for 1 day. The emulsion compositions in the sample bottles were visually observed, and the volume of phase separation in the total volume of the emulsion composition was evaluated according to the following criteria. The results are shown in Table 4.

[Criteria]

A: The phase-separated ratio is less than 10% of the total volume, and the stability is excellent.

B: The phase-separated ratio is 10% or more and less than 50% of the total volume, and the stability is slightly poor.

C: The phase-separated ratio is 50% or more of the total volume, and the stability is poor.

<Adhesiveness to Polyester-based Fiber>

Regarding the adhesiveness to the polyester-based fiber, reinforcing fibers were prepared according to the following procedure, and then test pieces for evaluation were prepared. The evaluation of the adhesiveness to the polyester-based fiber was performed only for Examples 1, 3, and 5 and Comparative Examples 1 and 2 in which the sum of the blending amounts of the liquid conjugated diene rubber, the diluent, the surfactant, and the sodium hydroxide in the mix proportion of Table 4 was 10% by mass of the whole (emulsion composition). The results are shown in Table 4.

(1) Production of Reinforcing Fiber

[Constituent Material of Surface Modified Layer (Surface Modifier)]

First, a constituent material (C-1) for the surface modified layer was prepared by mixing the following components.

Blocked isocyanate compound: 2.29 parts by mass

Epoxy compound: 0.8 parts by mass

Water: 96.91 parts by mass

The details of the compound used for C-1 are as follows.

Blocked isocyanate compound:

MEIKANATE DM-3031 CONC (manufactured by Meisei Chemical Works, Ltd., pure content 54% by mass)

Epoxy compound:

DENACOL EX-614B (manufactured by Nagase ChemteX Corporation, pure content 100% by mass)

[Method for Treating Twisted Cord]

Next, the following twisted cord was treated with the constituent material (C-1) for the surface modified layer. Specifically, two PET fibers (total fiber size: 1100 dtex, single fiber size: 6.10 dtex) as polyester-based fibers were twisted by 470 times/m of primary twisting and 470 times/m of finally twisting to prepare a twisted fiber cord. Next, the twisted cord was dipped in the constituent material (C-1) of the surface modified layer, and then squeezed with a roller. The obtained fiber cord was subjected to a drying treatment at 140° C. for 60 seconds, and further subjected to a heat treatment at 240° C. for 60 seconds.

Then, the obtained fiber cord was dipped in an emulsion containing the modified conjugated diene rubber (A-1) or the modified conjugated diene rubber (A-2), squeezed with a roller, subjected to a drying treatment at 140° C. for 60 seconds, and then wound to produce a reinforcing fiber.

(2) Preparation of Test Piece for Evaluation

Three fibers of the produced reinforcing fibers were arranged at regular intervals in an NR/SBR unvulcanized rubber composition prepared by the mix proportion described later. Then, the reinforcing fibers were press-vulcanized under the conditions of 150° C. and 20 kg/cm$^2$ for 30 minutes to prepare a test piece for evaluation.

[Blending Composition of NR/SBR Unvulcanized Rubber]

NR rubber: 70 parts by mass

SBR rubber: 41.25 parts by mass

Filler (carbon black): 45 parts by mass

Vulcanizing agent (sulfur powder): 3.5 parts by mass

Vulcanizing aid (zinc white, stearic acid): 6 parts by mass

Vulcanization accelerator (thiazole type): 1 part by mass (3) Evaluation

Finally, the force (N/3 fibers) required to T-peel the obtained test piece for evaluation from the rubber was measured, and the adhesiveness to fiber was evaluated as the rubber adhesive force. The results are shown in Table 4.

In the evaluation result of the rubber adhesive force, the larger the numerical value, the larger the adhesive force between the reinforcing fiber and the rubber.

[Criteria]

A: When the adhesiveness to polyester-based fibers is 70 (N/3 fibers) or more

B: When the adhesiveness to polyester-based fibers is 40 (N/3 fibers) or more and less than 70 (N/3 fibers)

C: When the adhesiveness to polyester-based fibers is less than 40 (N/3 fibers)

The values in parentheses in the table are the aforementioned measured values (N/3 fibers).

TABLE 4

| | | | Example | | | | | | Comparative Example | | |
|---|---|---|---|---|---|---|---|---|---|---|---|
| | | | 1 | 2 | 3 | 4 | 5 | 6 | 1 | 2 | 3 |
| Composition of Emulsion composition (part by mass) | Liquid conjugated diene rubber | Production Example 1 | 28 | 28 | 28 | 28 | 28 | 28 | 56 | 28 | 28 |
| | | Production Example 2 | | | | | | | | | |
| | Diluent having vapor pressure at 20° C. of 10 Pa or less | Naphthenic oil | 28 | 28 | | | | | | | |
| | | Paraffinic oil | | | | | 28 | 28 | | | |
| | | Low viscosity liquid rubber | | | 28 | 28 | | | | | |
| | Organic solvent (having vapor pressure at 20° C. of | Toluene | | | | | | | | 28 | 28 |

TABLE 4-continued

| | | Example | | | | | | Comparative Example | | |
|---|---|---|---|---|---|---|---|---|---|---|
| | | 1 | 2 | 3 | 4 | 5 | 6 | 1 | 2 | 3 |
| | more than 10 Pa) | | | | | | | | | |
| | Water | 540 | 140 | 540 | 140 | 540 | 140 | 540 | 540 | 140 |
| | Surfactant | 3 | 3 | 3 | 3 | 3 | 3 | 3 | 3 | 3 |
| | Sodium hydroxide | 0.1 | 0.1 | 0.1 | 0.1 | 0.1 | 0.1 | 0.1 | 0.1 | 0.1 |
| | Total | 599.1 | 199.1 | 599.1 | 199.1 | 599.1 | 199.1 | 599.1 | 599.1 | 199.1 |
| Conjugated diene rubber content in emulsion composition (% by mass) | | 4.7 | 14.1 | 4.7 | 14.1 | 4.7 | 14.1 | 9.3 | 4.7 | 14.1 |
| Diluent content in emulsion composition % by mass) | | 4.7 | 14.1 | 4.7 | 14.1 | 4.7 | 14.1 | 0.0 | 0.0 | 0.0 |
| Evaluation | Ease of production [Viscosity at the time of dilution (Pa · s)] | 67 | 67 | 40 | 40 | 90 | 90 | 320 | 1.4 | 1.4 |
| | Stability of emulsion composition | A | A | A | A | A | A | A | C | B |
| | Adhesiveness [Adhesiveness to polyester-based fiber (N/3 fibers)] | A (94) | — | A (75) | | A (98) | — | B (68) | — | Un-measurable[1)] |

[1)]Poor stability and impossible adhesion test

<Adhesiveness to Polyamide-Based Fiber>

Regarding the adhesiveness to the polyamide-based fiber, reinforcing fibers were prepared according to the following procedure, and then test pieces for evaluation were prepared.

The evaluation of the adhesiveness to the polyamide-based fiber was performed only for Example 7 in which the sum of the blending amounts of the liquid conjugated diene rubber, the diluent, the surfactant, and the sodium hydroxide in the mix proportion of Table 5 was 10% by mass of the whole (emulsion composition). The results are shown in Table 5.

(1) Production of Reinforcing Fiber [Constituent Material of Surface Modified Layer (Surface Modifier)]

First, a constituent material (D-1) for the surface modified layer was prepared by mixing the following components.

Polyethyleneimine compound: 0.01 parts by mass

Water: 99.99 parts by mass

The details of the compound used for D-1 are as follows.

Polyethyleneimine compound (SP-200 manufactured by Nippon Shokubai Co., Ltd.)

[Method for Treating Twisted Cord]

Next, the following twisted cord was treated with the constituent material (D-1) for the surface modified layer. Specifically, two nylon fibers (total fiber size: 1400 dtex, single fiber size: 6.86 dtex), which are polyamide-based fibers, were twisted by 470 times/m of primary twisting and 470 times/m of finally twisting to prepare a twisted fiber cord. Next, the twisted cord was dipped in the constituent material (D-1) of the surface modified layer, and then squeezed with a roller. The obtained fiber cord was subjected to a drying treatment at 140° C. for 60 seconds, and further subjected to a heat treatment at 210° C. for 60 seconds.

Then, the obtained fiber cord was dipped in an emulsion containing the modified conjugated diene rubber (A-2), squeezed with a roller, subjected to a drying treatment at 140° C. for 60 seconds, and then wound to produce a reinforcing fiber.

TABLE 5

| | | | Example | |
|---|---|---|---|---|
| | | | 7 | 8 |
| Composition of Emulsion composition (part by mass) | Liquid conjugated diene rubber | Production Example 1 | | |
| | | Production Example 2 | 28 | 28 |
| | Diluent having vapor pressure at 20° C. of 10 Pa or less | Naphthenic oil | 28 | 28 |
| | | Paraffinic oil | | |
| | | Low viscosity liquid rubber | | |
| | Organic solvent (having vapor pressure at 20° C. of more than 10 Pa) | Toluene | | |
| | Water | | 540 | 140 |
| | Surfactant | | 3 | 3 |
| | Sodium hydroxide | | 0.1 | 0.1 |
| | Total | | 599.1 | 199.1 |
| | Conjugated diene rubber content in emulsion composition (% by mass) | | 4.7 | 14.1 |
| | Diluent content in emulsion composition (% by mass) | | 4.7 | 14.1 |
| Evaluation | Ease of production [Viscosity at the time of dilution (Pa · s)] | | 468 | 468 |
| | Stability of emulsion composition | | A | A |
| | Adhesiveness | | 63 | — |

TABLE 5-continued

| | Example | |
|---|---|---|
| | 7 | 8 |
| [Adhesiveness to polyamide-based fiber (N/3 fibers)] | | |

As is clear from the descriptions of Examples and Comparative Examples, according to the present invention, it is possible to obtain an emulsion composition having excellent emulsion stability. In addition, it can be seen that when the emulsion composition of the present invention is used for adhesion, excellent adhesiveness is exhibited.

The invention claimed is:

1. An oil-in-water emulsion composition comprising
a liquid conjugated diene rubber,
a diluent having a vapor pressure at 20° C. of 10 Pa or less,
a surfactant,
at least one basic compound selected from the group consisting of sodium hydroxide and ammonia, and
water.

2. The emulsion composition according to claim 1, wherein the liquid conjugated diene rubber contains a monomer unit derived from one or more selected from butadiene, isoprene, and β-farnesene.

3. The emulsion composition according to claim 1, wherein the liquid conjugated diene rubber is a modified conjugated diene rubber having a hydrogen bonding functional group in a part of the conjugated diene rubber.

4. The emulsion composition according to claim 3, wherein the hydrogen bonding functional group is one or more selected from a hydroxy group, an epoxy group, an aldehyde group, an acetalized product of an aldehyde group, a carboxy group, a salt of a carboxy group, an esterified product of a carboxy group, an acid anhydride of a carboxy group, a boronyl group, a salt of a boronyl group, an esterified product of a boronyl group, a silanol group, and an esterified product of a silanol group.

5. The emulsion composition according to claim 1, wherein the surfactant is a nonionic surfactant.

6. The emulsion composition according to claim 1, wherein a content of the surfactant in the emulsion composition is 1 to 15 parts by mass with respect to 100 parts by mass of a total of the liquid conjugated diene rubber and the diluent.

7. A method for producing the emulsion composition according to claim 1, the method comprising
mixing the liquid conjugated diene rubber, the diluent, the surfactant, the at least one basic compound, and water to produce the oil-in-water emulsion, and then
not removing the diluent.

* * * * *